United States Patent [19]
Wilkins et al.

[11] 3,749,495
[45] July 31, 1973

[54] GAS ANALYZER UTILIZING INFRARED EMISSION FROM GASEOUS MOLECULES
[75] Inventors: Paul E. Wilkins, Fairfax, Va.; Allan L. Budd, San Diego, Calif.
[73] Assignee: Monitor Labs, Inc., San Diego, Calif.
[22] Filed: Nov. 17, 1971
[21] Appl. No.: 199,650

[52] U.S. Cl.......... 356/51, 250/43.5 R, 250/83.3 H, 356/85
[51] Int. Cl...................... G01n 21/22, G01n 21/34
[58] Field of Search.......................... 356/51, 85–87; 250/43.5 R, 83.3 H, 239; 331/94.5

[56] References Cited
UNITED STATES PATENTS
3,594,658 7/1971 Cason et al..................... 331/94.5 G
3,561,846 2/1971 Kingsland ....................... 250/239 X
3,516,745 6/1970 Schuman ............................. 356/85
3,679,899 7/1972 Dimeff............................. 356/51 X OTHER PUBLICATIONS
Frieberg et al., Journal of Applied Physics, vol. 38, No. 1, January, 1967, pages 250–262.

Primary Examiner—Ronald L. Wibert
Assistant Examiner—F. L. Evans
Attorney—Paul M. Cohen et al.

[57] ABSTRACT

A gaseous sample is introduced into an optical cavity where the sample undergoes periodic compression and expansion. A detector is provided for measuring the variation in infrared emission from certain chemical components in the gas, as the gas undergoes compression and expansion. The measurement reveals the concentration of the component chemicals relative to the gas sample.

8 Claims, 7 Drawing Figures

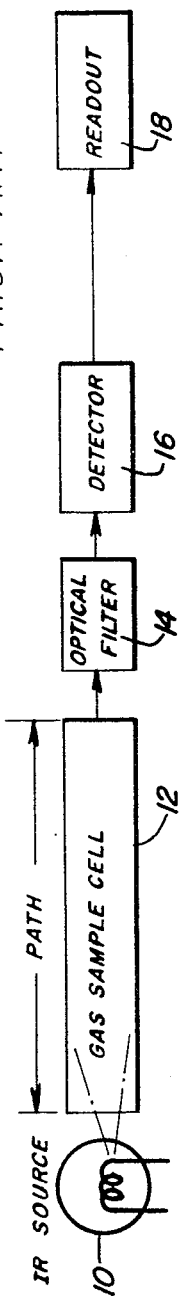
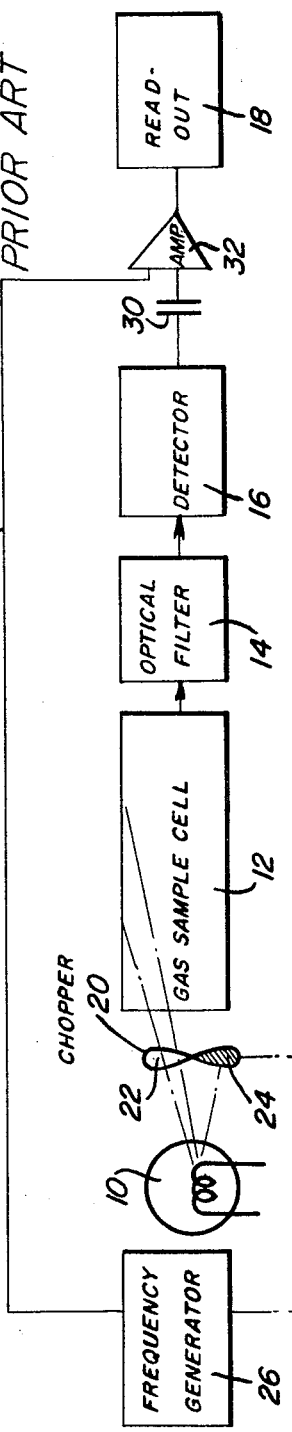
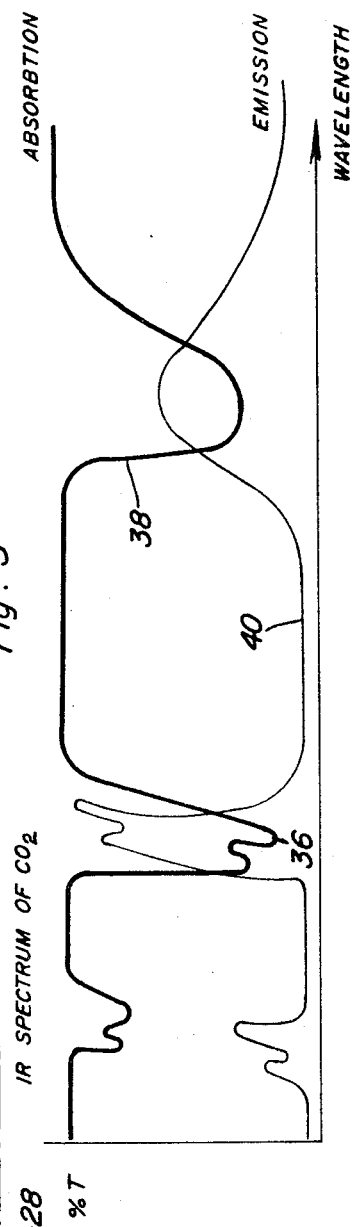
Paul E. Wilkins
Allan L. Budd
Paul M. Cohen
Morris Liss
INVENTORS
BY
ATTORNEYS

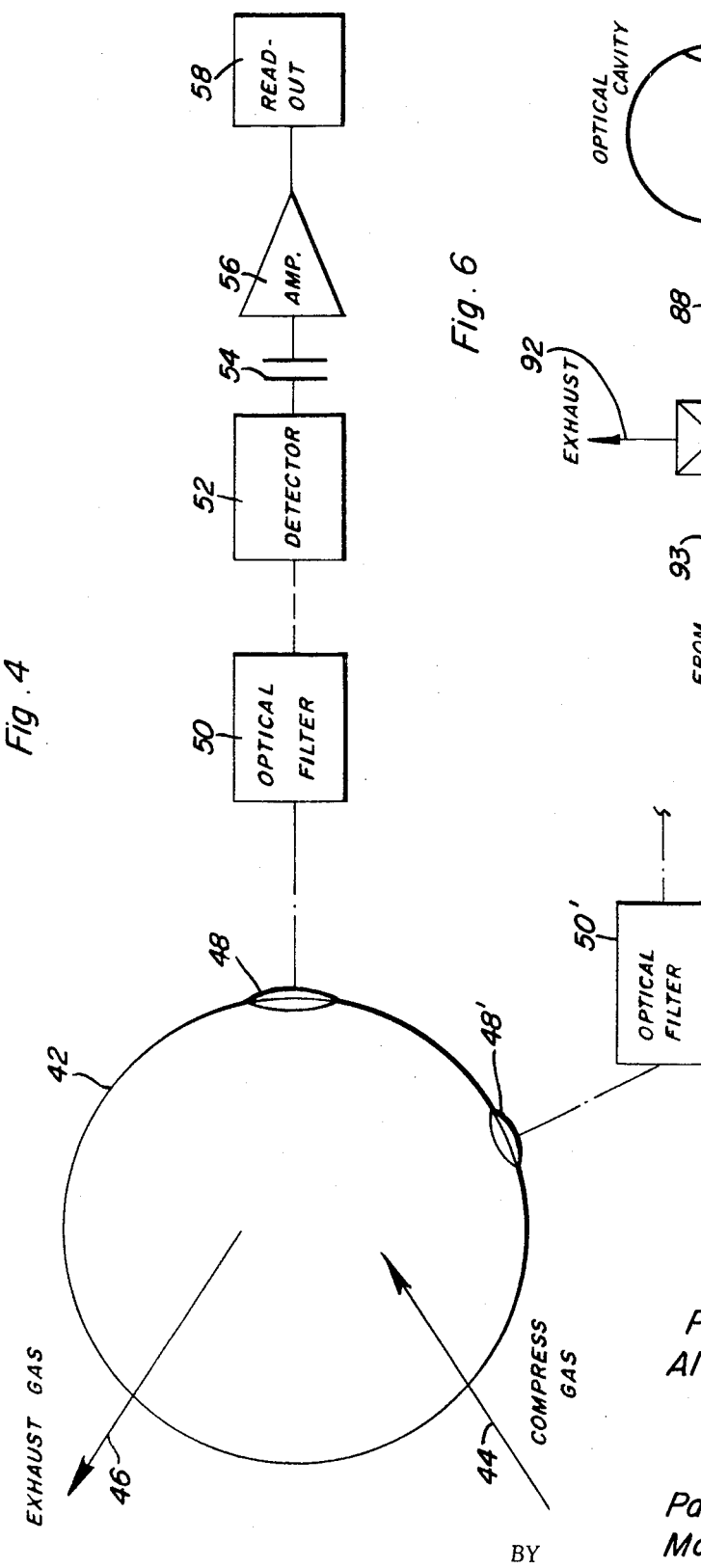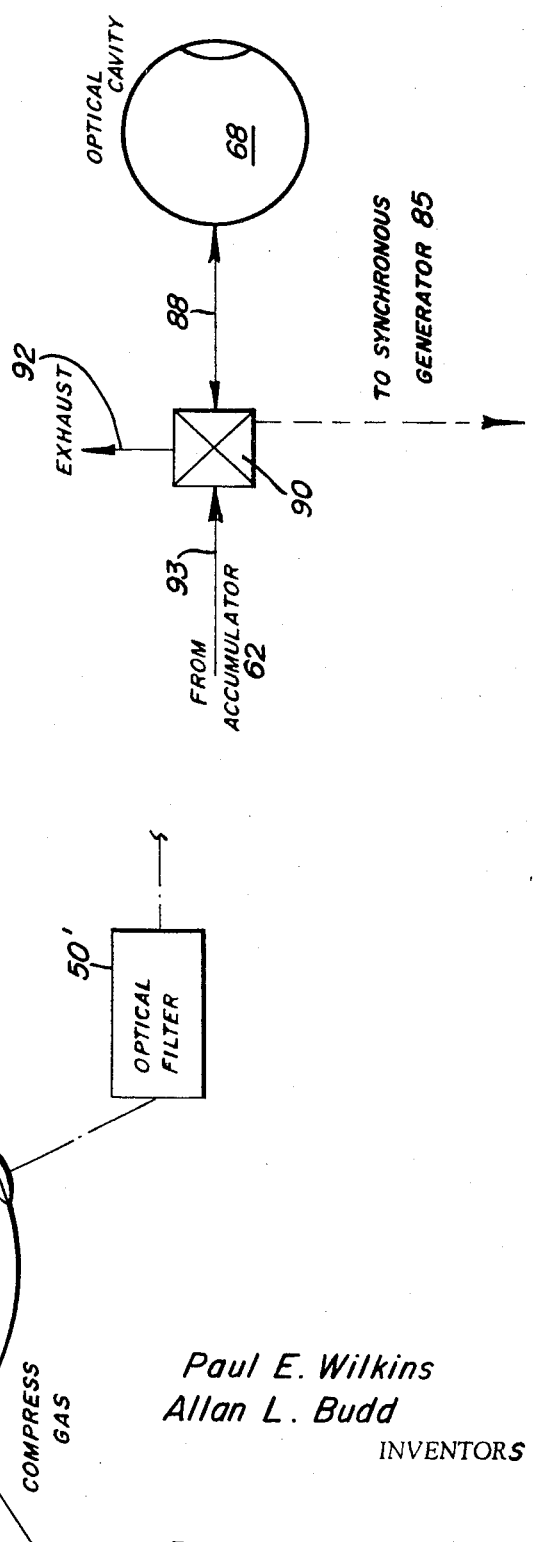
Paul E. Wilkins
Allan L. Budd
INVENTORS
Paul M. Cohen
Morris Liss
BY
ATTORNEYS

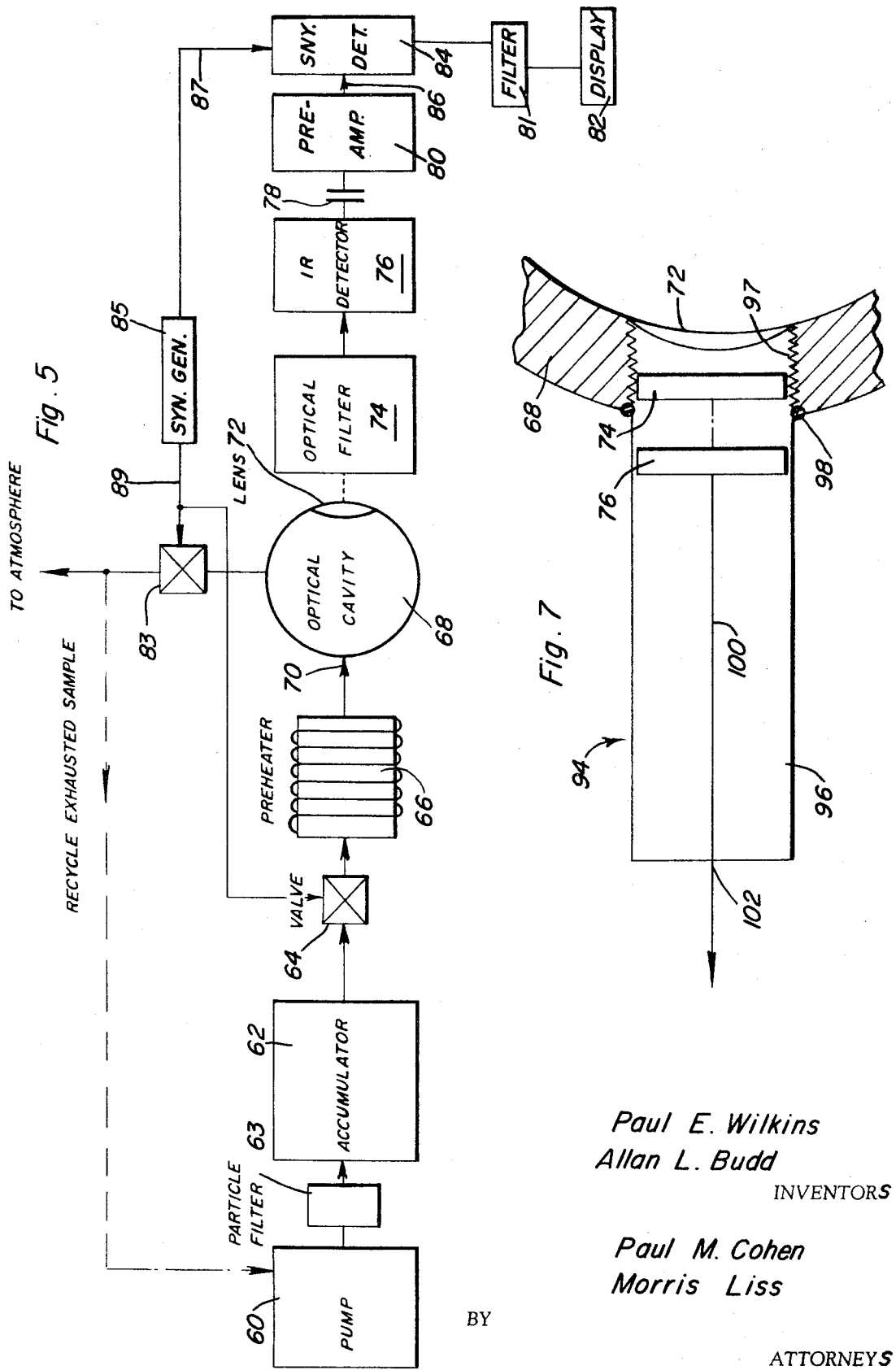

GAS ANALYZER UTILIZING INFRARED EMISSION FROM GASEOUS MOLECULES

FIELD OF THE INVENTION

The present invention relates to infrared instrumentation for measuring the concentration of certain chemical components in a gaseous mixture. More particularly, the invention measures the percentage concentration of specific gas pollution components in air.

THE PRIOR ART

During the early days of infrared technology, experimentors found that gaseous molecules absorb infrared energy having wavelengths particular to the chemical composition of the molecules. Thus, it was discovered, that a gaseous compound generates its own unique infrared spectrum which is analagous to a fingerprint. The earliest mode of infrared spectroscopy employed an absorption technique. Briefly, in accordance with this technique, infrared energy such as light passes through a gas cell and at the other end of the cell, the percentage of light transmission is measured. The greater the concentration of a particular gas component in the gaseous mixture, the greater is the absorption of infrared energy. By increasing this concentration, absorption increases and the resultant detected signal decreases. The extent of the decrease corresponds directly with the concentration of the detected gaseous component in the mixture.

Experience has demonstrated that the absorption technique has severe limitations. Although detection of large concentrations can be satisfactorily accomplished, it becomes extremely difficult to detect small concentrations because under such circumstances the percentage of energy transmission through the gas is not greatly affected since the molecular population of the component gas is small. Thus, if one wishes to detect small concentrations of gas with the absorption technique, it is necessary to use an infrared source of great capacity. A related problem of absorption measurements is that an external infrared source must always be provided.

A further disadvantage of absorption measurement resides in the fact that an emitted source beam is directed along an energy path that is not entirely aligned with a detector. Thus, the detector appears to measure a net loss of energy which is not actually the case. Accordingly, extensive compensation must be provided.

A further disadvantage of absorption measurements is developed due to the internal heating of a sample cell which adds a D.C. source of infrared energy thereby making it difficult to determine how much energy is being absorbed from the infrared source itself.

Inasmuch as gaseous molecules also emit infrared energy in a unique infrared spectrum, previous experimentors have utilized infrared emissions as a measurement of gas concentration. As an example, reference is made to U.S. Pat. No. 3,516,745 to Schuman which discloses an apparatus for analyzing gas by stimultaing molecular emission of infrared energy, and measuring the emission. In the case of the referenced patent, a free running piston periodically compresses a heated gas to stimulate emission. The emission is detected and measured during periods of compression and expansion of the gas. The variation in emission can be correlated to the concentration of gas within the piston. Due to the reliance of such a system on a free running piston, many problems arise. As just one example, the free running piston will stop oscillating when foreign matter becomes deposited between itself and a surrounding cylinder wall. Other problems become evident due to the strong reliance upon external heating of the gas being measured.

SUMMARY OF THE INVENTION

The present invention is related to an apparatus which is simple in design, reliable, and rugged. The disclosed instrumentation utilizes the relationship between infrared emission from gas molecules and the concentration thereof. The invention suffers none of the disadvantages that attend absorption measurement. Because a compressed gas will become heated due to increased molecular collision, the gas itself forms an infrared source (heat). By measuring the variation in emission from the gas molecules between compression and expansion, a differential emission is produced that depends upon the concentration of gas. Because there is no reliance upon a large external infrared source, as in the case of absorption measurements, the emission technique lends itself to the measurement of small gas concentrations.

Unlike the previously referenced patent, the present invention includes a separate optical cavity into which previously compressed gas is introduced and exhausted. There is no reliance upon a free running piston and as a result, the present system is more reliable and can be expected to have far fewer maintenance problems.

These and other objects and advantages of this invention will become apparent upon reading the following description, of which the attached drawings form a part.

BRIEF DESCRIPTION OF THE DRAWINGS

FIG. 1 is a block diagram of a prior art infrared absorption measurement system.

FIG. 2 is a block diagram of an improved system as illustrated in FIG. 1.

FIG. 3 is a graph of absorption and emission plots for carbon dioxide. FIG. 4 is a block diagram illustrating the basic components of the present infrared emission system.

FIG. 5 is a block diagram illustrating the present system components in detail.

FIG. 6 is a block diagram illustrating an alternate valve arrangement for compression-exhaust of a cavity held gas.

FIG. 7 is a sectional view of an optical module for use with the present ivention.

DESCRIPTION OF THE INVENTION

Referring to FIG. 1, a block diagram representation of the prior art absorption apparatus is shown for the measurement of a component in a gaseous mixture. An infrared source such as a lamp 10 is placed adjacent one transverse end of a transparent gas sample cell 12. The cell has a preselected path or length through which the light is transmitted. Assuming that certain molecules of a gas component population are at a ground energy level, the infrared source 10 will excite these molecules due to their absorption of infrared energy. The energy absorption is due to molecular motion of compounds. More particularly, there is an exchange of vibrating energy in the molecular bonds of each compound. The vibration or oscillation occurs at predetermined constant frequencies that are unique for particular compounds. The molecular population undergoing absorption reaches an energy level where emission or energy release takes place. Then, this cycle is repeated. In essence, the transition of a molecule between absorption and emission is analagous to the translation of potential to kinetic energy by a swinging pendulum.

The equation that expresses the relationship between transmission of infrared energy through the gas cell, and absorptivity is expressed by Beers Law:

$$\log 1/(100 \times \% \text{ T}) = \text{path} \times \text{absorptivity} \times \text{C}$$

As can be seen from the above equation there are two equation constants, namely, the path length of cell 12 as indicated in FIG. 1, and the equation constant C. Therefore absorptivity is inversely related to percentage of infrared energy transmission through the cell as a log function. Accordingly, it can be appreciated that a definite relationship exists between molecular absorption and infrared transmission.

As previously mentioned, different gaseous compounds have different infrared spectra. An optical filter 14 is positioned at the outer end of cell 12 so that only the frequencies of the gas compound under observation will pass to a detector 16. A read-out display or meter 18 is provided to measure the output of detector 16. It should be mentioned that the optical filter 14 can be a manochrometer. The prior art absorption system of FIG. 1 is calibrated by setting the read-out 18 to 100 percent transmission when there is not active gaseous sample in the gas cell 12. Then, the read-out 18 is zeroed by blocking the light source 10.

Although the system of FIG. 1 forms a theoretical basis for explaining absorption techniques, the illustrated system is impractical because the cell becomes heated and acts as an independent, unwanted infrared source which is substantially D.C. in nature. In order to preclude the influence of this D.C. source, A.C. detection is added as illustrated in FIG. 2. The system shown in FIG. 2 includes the same components as illustrated in FIG. 1 and discussed above. However, to achieve an alternating condition, a chopper 20 is positioned between the light source 10 and the entrance of the gas sample cell 12. The chopper can manifest itself as a circular disc having half its area transparent and the other half opaque. Thus during half the rotational cycle of the chopper, light freely passes from the source 10 to the cell 12. During the other half of the cycle, no light is permitted to pass. The transparent portion of chopper 20 is schematically illustrated by reference numeral 22, while the opaque portion is indicated by 24. A frequency generator 26 schematically drives (28) the chopper 20 through mechanical means such as a synchronous motor (not shown). Also, the frequency generator 26 enables amplifier 32 to pass the A.C. detected signal which is relieved of its D.C. component by a blocking capacitor 30. The enable line is indicated by reference numeral 34.

Referring to FIG. 3, an infrared spectrum of carbon dioxide is illustrated. As will become apparent from this figure, there is a minimum point 36 at a particular wavelength. This point is distinctive to carbon dioxide. For other compounds, this minimum point on the infrared spectrum will be at a different wavelength. It is interesting to note that the absorption spectrum 38 is a mirror image of the emission spectrum 40. Therefore, measuring infrared energy emitted or absorbed by a material at a unique wavelength, will insure that a single gaseous material is being monitored. It is at this wavelength that concentration measurements are made.

The present invention is particularly adapted to measure the low concentration of pollutants or precursors to pollution in the air. Normal atmospheric gases include nitrogen, oxygen, carbon dioxide, water vapor, and trace gasses. However, as our industrialization progresses, gaseous compounds other than these become manifest in our atmosphere and cause toxic conditions for animal and vegetable life. Typical gas pollutants that society is now concerned with include oxides of nitrogen, ozone, carbon monoxide, sulfur dioxide, sulfur trioxide, and hydrocarbons other than naturally found methane. Precursors to air pollution include for example, nitric oxide which is a precursor to nitric dioxide.

Because the previously enumerated gaseous pollutants have infrared spectra, it is possible to measure their concentration by infrared techniques. However, if one were to use the previously discussed prior art absorption technique, only those pollutants with relatively high concentrations could be detected. Therefore, it is highly advantageous to employ an emission technique from which more sensitive measurements can be made in view of the fact that an external infrared source is not required. Further, greater sensitivity can be realized because the detector of a system looks at the molecular population of the pollutant, rather than looking at the light source. Fortunately, the prevalent atmospheric gasses nitrogen and oxygen have no infrared spectra. Therefore, they need not be considered in the measurement of gaseous pollutants.

Referring to FIG. 4, a basic block diagram of the present invention is illustrated. An optical cavity 42 of noncritical design periodically receives a compressed gas as indicated by 44. After a preselected maximum pressure is obtained in the optical cavity 44, the gas is exhausted as indicated by 46. A lens 48 is provided in the wall of the optical cavity 42 to permit emitted infrared energy to pass from the optical cavity 42. An optical filter 50 is arranged in a line of sight with lens 48. As in the case of the prior art absorption systems, the filter 50 passes infrared energy of a preselected wavelength that will definitely identify the component of the gas mixture introduced into optical cavity 42. Detector 52 produces an electrical signal in accordance with the filtered infrared energy.

The primary novelty of the system, taken as a whole, lies in the fact that the alternating conditions previously achieved by chopping the beam of a light source can now be effected by cyclically compressing and expanding the gas in the optical cavity 42. By so doing, the molecular population will be periodically varied with the result that the gas will heat upon compression and cause the gas molecule population to emit infrared energy at a high level. When the gas is exhausted from cavity 42, the population or molecular density decreases and the emission decreases substantially. By detecting this cyclical variation in emission, an alternating signal is produced by detector 52. It has been found that the peak detected signal during compression may be 10 times the signal occuring at the conclusion of gas expansion. With this type of gain, it is easy to see the advantages of employing infrared emission technology for the analysis of small concentration gas pollutants.

The fact that the walls of the optical cavity may become heated and emit a D.C. level of infrared energy is immaterial because this D.C. level is blocked by series connected capacitor 54. The A.C. signal passing through the capacitor is amplified by amplifier 56 which drives the read-out 58.

Of course, it is an important design consideration that inlet and exhaust valves be provided in the optical cavity 42 so that gas is released at the same peak pressure during every cycle. Further, a reliable pump must be provided to compress the gas in the optical cavity 42 to the same peak pressure before release.

FIG. 5 illustrates a more elaborate block diagram of the present invention. The previously discussed compression of the gas undergoing analysis is pressurized by pump 60 which may, for example, be of the metal bellows type as manufactured by Bell and Gossett (NB-301). In order to damp pressure pulsations from the pump, an accumulator or gas reservoir 62 is connected to the outlet of the pump 60. In many applications, it would be advisable to insert an in-line particle filter 63 between the pump 60 and the accumulator 62. A suitable filter may take the form of sintered TEFLON as manufactured by Milipore, Inc. The outlet of the accumulator 62 feeds a valve 64 that is selectively opened when compressed gas is to flow into optical cavity 68. Because infrared emission is enhanced by introducing a heated gas into the optical cavity 68, a preheater 66 could be intermediately disposed between valve 64 and the optical cavity 68. In a preferred embodiment of the invention, the optical cavity 68 could be spherical with an interior surface of high reflectivity and low emissivity. One excellent choice for the interior surface of the optical cavity is gold plate which has the lowest emissivity to reflectivity ratio, and is chemically inert. In order to properly handle the gas sample being analyzed, it may be necessary to control the temperature of the sample being introduced into the optical cavity. One suitable way of doing this is to have the sample exposed, in a manner not shown, to a thermoelectric module. One such device is a solid state module manufactured by Cambridge Electronics, Inc. (Cambion). By exposing the incoming sample at the optical cavity inlet 70 to such a thermoelectric module, the temperature of the incoming gas sample could be regulated with extreme precision. Although not shown, this module has been used in similar applications where temperature variation is sensed by an appropriate thermal sensor, and a control signal is fed through the thermoelectric module which varies the temperature on its surface in accordance with the control signal thereat.

The lens 72, optical filter 74, detector 76, and DC blocking capacitor 78 operate as previously explained in connection with FIG. 4. However, the circuitry of FIG. 5 introduces a preamplier 80 that amplifies the AC signal from the capacitor 78. The preamplifier output is connected to a first input 86 of a synchronous detector 84 that gates the preamplified signal therethrough during detection or sampling intervals generated by a synchronous generator 85. The synchronous generator 85 has a first output which drives a second input 87 of the synchronous detector 84. The synchronous generator 85 enables the detector 84 for a sampling interval sufficient to allow measurement of the infrared radiation from the optical cavity 68. In order to accomplish this measurement, a filter 81 filters the noise from the output signal of synchronous detector 84. The filtered signal is then delivered to an appropriate display 82 such as a readout meter or cathode ray tube.

The synchronous generator 85 serves as a clock for the system shown in FIG. 5. The generator 85 has a second output that is connected by lead 89 to the parallel connected accumulator control valve 64 and the valve 83 which is an exhaust valve for the optical cavity 68.

In operation of the synchronous generator 85 and detector 84, the generator typically generates the square wave clock pulse train signal. At the leading edge of the generator signal, the synchronous generator 85 closes the solenoid exhaust valve 83 and opens the solenoid valve 64 so that pressure in the accumulator 62 is transferred to the optical cavity 68. At the same time, the synchronous generator initiates an enable interval during which time the synchronous detector 84 is gated on, and the signal from the infrared detector 76 is transferred to the display 82 through filter 81. The interval is sufficiently long to allow infrared detection when the pressure in the optical cavity 68 reaches its maximum value corresponding to maximum infrared emission.

As the signal from the synchronous generator 85 produces a trailing edge, the valve 83 is opened and the valve 64 is closed. As this occurs, the optical cavity 68 exhausts to atmosphere and pressure again builds up in the accumulator 62. This cycle of operation is then repeated.

As indicated in FIG. 5, rather than valve 83 venting to atmosphere, suitable tubing may be connected to recycle the exhausted sample from valve 83 to pump 60. The choice of venting to atmosphere or recycling depends upon particular measurement requirements.

Considering compression in optical cavity 68, as the pressure increases so does the temperature. In effect, an adiabatic compression takes place wherein the total energy within the cavity remains constant. As a result, the increase in temperature closely follows the increase in pressure and when the measurement is made at readout 82, it is made during an interval when the temperature and pressure are maximum in the optical cavity 68. The preheating of the gas by preheater 66 may be extremely desirable in certain applications inasmuch as the emission of infrared energy is a function of the temperature to the fourth power whereas it is a function of pressure only to the first power.

The construction of the present invention has an inherent advantage over the prior art absorption techniques. As previously mentioned, with such techniques, the gas cell begins to absorb thermoenergy from the surrounding wall of the cell which becomes heated in time. However, this heating effect does not take place to any significant extent with the present system. This is due to the fact that before the compressed gas can conduct heat to the optical chamber walls, the gas is exhausted and upon expansion there is a cooling effect in accordance with the Carnot Cycle. This cooling prevents the chamber walls from heating and emitting infrared energy which would add a thermal noise factor to the eventual measurement.

FIG. 6 illustrates an alternate embodiment for the electrically actuated valves 64 and 83 as shown in FIG. 5. The illustration in FIG. 6 shows a three-way solenoid driven valve 90 having a single exhaust line 92 and an inlet line 93 which communicates with the accumulator 62. The common intake-outlet line 88 communicates between the valve 90 and the inlet port of the optical cavity 68. The electrical control line 95 for the valve is connected to the previously mentioned synchronous generator 85 (FIG. 5). Such a solenoid actuated valve is manufactured by the Skinner Corporation and is identified as Model A3DB2127. Of course, the valve intake and exhaust functioning as described can be accomplished by an equivalent mechanically driven valve.

Returning to FIG. 5, the lens 72 can typically be fabricated from germanium or silicon. The optical filter 74 can be of the type manufactured by Optical Coating Labs, Inc., and identified as Model NO425DIA. The detector 76 may be of the lead sulfide or lead selenide type. The latter mentioned type is manufactured by OPTO, Inc.

FIG. 7 illustrates an optical module generally indicated by reference numeral 94. The purpose of this module is to compactly mount the optical components of the system as illustrated in FIG. 5. By specially fitting the optical filter within the module, it is possible to have a module particularly designed to analyze a specific gas. The module comes in a hermetically sealed package having a cylindrical body 96 which is screwed into a threaded aperture 97 formed in the wall of the optical cavity 68. The inner end of the module 94 includes a lens 72 which in this particular instance is preferably gound to conform with the contour of the cavity inner surface. An O-Ring 98 encircles the cylindrical body 96 and prevents leakage from the aperture 97. The interior of the cylindrical body 96 includes the previously discussed optical filter 74 and detector 76. An electrical lead 100 connects the detector filter 74 and detector 76. An electrical lead 100 connects the detector 76 with an output terminal 102. As will be appriciated, by employing different optical filters 74, one can have available several modules, respectively designed to analyze a different gas compound. In fact, by using different modules at spaced points within the optical cavity 68, various gaseous components of the enclosed gas mixture can be analyzed simultaneously. This is indicated by lens 48' in FIG. 4.

Several other advantages to using the package of FIG. 7 can be realized. Firstly, in an ideal situation, the detector 76 forms part of the cavity wall to give a maximum solid angle for emission. Inasmuch as fasteners, spacers, and other mechanical components are not present between the lens 72, optical filter 74, and detector 76 of the optical module 94, detector 76 can be placed more closely to the aperture 97. Also, the packaged optical components in FIG. 7 cut down on the optical path length which is advantageous.

It should be understood that the invention is not limited to the exact details of construction shown and described herein for obvious modifications will occur to persons skilled in the art.

Wherefore, the following is claimed:

1. A method for analyzing a gaseous mixture to detect the presence of at least one molecular component, the method including the steps of:

providing a gaseous mixture having molecules with a first energy level distribution;

causing the generally adiabatic pressurization of the fluid at a first point to raise the temperature of the mixture resulting in a second energy level distribution of the mixture substantially above the first energy level distribution;

transporting the pressurized mixture to an optical cavity remote from the first point where the mixture evidences infrared emission due to the elevated energy level distribution;

permitting the passage of infrared emission from the cavity along at least one path;

detecting the radiation from emission in at least one preselected wavelength band indicative of a predetermined molecular component of the gaseous mixture.

2. The method of claim 1 wherein the infrared emission is permitted to pass from the cavity along a plurality of paths.

3. The method of claim 2 wherein detection of emission occurs along each path for detecting a plurality of preselected wavelenth bands indicative of respective molecular components in the mixture.

4. The method of claim 3 together with the step of optically filtering the infrared emission along each path to insure detection of only one component.

5. The method defined in claim 1 together with the step of accumulating the pressurized gaseous mixture prior to the entry into the optical cavity thereby decreasing pressure pulsations in the mixture.

6. The method set forth in claim 5 together with the step of mechanically filtering the mixture prior to its introduction into the cavity thereby eliminating particulate matter therefrom.

7. A method for analyzing a gaseous mixture to detect the presence of at least one molecular component, the method including the steps of:

providing a gaseous mixture having molecules with a first energy level distribution;

generating synchronous timing cycles, each such cycle having a predetermined operational duration;

causing a generally adiabatic pressurization of the mixture at a first location during the cycle duration to raise the temperature of the mixture resulting in a second energy level distribution of the mixture substantially above the first energy level distribution;

transporting the pressurized mixture to an optical cavity remote from the first location, where the mixture evidences gradually increasing infrared emission as the optical cavity becomes pressurized with the mixture, during the duration, due to the elevated energy level distribution;

permitting the passage of infrared emission from the cavity along at least one path;

detecting radiation from the time varying emission in at least one preselected wavelength band indicative of a predetermined molecular component of the gaseous mixture;

enabling information from the detecting step to be utilized only during the operational duration to maximize emission detection gain; and venting the optical cavity at the end of the duration which decreases the infrared emission and restores the cavity to an original condition for a subsequent cycle.

8. A system for measuring the concentration of at least one molecular component in a gaseous mixture comprising:

means for generating timing signals, each signal having a predetermined duration;

inet means for receiving a gaseous mixture having molecules with a first energy level distribution;

means for pressurizing the mixture substantially adiabatically at a first location to raise the temperature of the mixture resulting in a second energy level distribution of the mixture substantially above that of the first energy level distribution;

connecting means for directing the pressurized mixture to an optical cavity remote from the first location during the timing signal duration, where the mixture evidences gradually increasing infrared emission due to the elevated energy level distribution as the optical cavity becomes filled with the pressurized mixture;

means for permitting passage of infrared emission from the cavity along at least one path;

detection means for detecting radiation from the time varying emission, in at least one preselected wavelength band indicative of a pre-determined molecular component of the gaseous mixture;

means connecting the signal generating means to gated synchronous detection means for enabling transmission of information from the radiation detection means to further concentration readout means, only during the duration of a timing signal, thereby maximizing emission detection gain; and means for venting the optical cavity at the end of the duration of the timing signal which decreases the infrared emission and restores the cavity to an original condition for a subsequent cycle.

* * * * *